United States Patent [19]
Gilbert et al.

[11] 3,891,717
[45] June 24, 1975

[54] PREPARATION OF O-CHLOROPHENOLS

[75] Inventors: Eugene C. Gilbert, Hanover Park; Robert E. Jones, Arlington Heights, both of Ill.; Edward Sherman, Genoa City, Wis.

[73] Assignee: The Quaker Oats Company, Chicago, Ill.

[22] Filed: Mar. 11, 1974

[21] Appl. No.: 449,710

Related U.S. Application Data

[63] Continuation-in-part of Ser. No. 115,772, Feb. 16, 1971.

[52] U.S. Cl. .......................... 260/623 R; 260/621 H
[51] Int. Cl. ....................... C07c 39/27; C07c 39/30
[58] Field of Search ........ 260/619 R, 623 R, 621 H, 260/621 R

[56] References Cited
UNITED STATES PATENTS
2,730,533  1/1956  Unhoefer ........................... 260/369
3,692,839  9/1972  Wehrli ........................... 260/586 R Primary Examiner—Bernard Helfin
Assistant Examiner—W. B. Lone
Attorney, Agent, or Firm—Joseph P. O'Halloran

[57] ABSTRACT

This invention relates to a new process for the preparation of isomerically pure ortho chloro-substituted phenols by the dehydrochlorination of a composition of the following general formula in the presence of a catalyst.

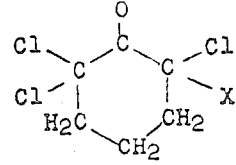

Wherein X is a hydrogen or chlorine radical.

14 Claims, No Drawings

PREPARATION OF O-CHLOROPHENOLS

CROSS-REFERENCES TO RELATED APPLICATIONS

This application is a continuation-in-part of application Ser. No. 115,772, filed Feb. 16, 1971, patent pending.

BACKGROUND OF THE INVENTION

1. FIELD OF THE INVENTION

This invention relates to the dehydrochlorination of 2,2,6-trichlorocyclohexanone and 2,2,6,6-tetrachlorocyclohexanone in the presence of a catalyst selected from amines, amides, ureas and acid salts thereof.

2. DESCRIPTION OF THE PRIOR ART

Hereinbefore isomerically pure ortho chloro-substituted phenols have not been readily available. o-Chlorophenol is generally prepared by one of two methods: (1) the chlorination of phenol or (2) the hydrolysis of o-dichlorobenzene. 2,6-Dichlorophenol can be prepared by the chlorination of o-chlorophenol.

o-Chlorophenol for example, has been made commercially by the direct chlorination of molten phenol at temperatures between 50°C. and 150°C. This process has two main disadvantages: (1) the chlorine ratio must be carefully controlled to avoid the formation of di- and tri-substituted products; and (2) m- and p-chlorophenol are also produced. Considerable work has been done to develop conditions favoring ortho substitution; however, no easy way has been found. The process of the prior art for the preparation of o-chlorophenol by the chlorination of phenol therefore has the disadvantage that there is little specificity of the reaction; that is, chlorination could take place in the meta and para, as well as the ortho position, and could lead to more highly chlorinated phenols.

Various methods have been proposed for the partial hydrolysis of o-dichlorobenzene to o-chlorophenol. The hydrolysis can be carried out in the vapor phase with steam and finely divided silicates, bauxite, and magnesite, at 500°–700°C., or in aqueous methanol or ethanol at high pressures and temperatures in the presence of alkali, alkaline earths, or alkaline carbonates. Both of these procedures require strict control to avoid complete hydrolysis to o-dihydroxybenzene. The hydrolysis may also require a comparatively long reaction time, e.g. 30 to 90 minutes.

Mixtures of 2,4- and 2,6-dichlorophenol are commonly encountered as the dichlorophenol product of preparations designed to make the 2,6-isomer. For example, when one attempts to make 2,6-dichlorophenol by chlorinating o-chlorophenol in a non-polar solvent medium, the phenolic product attained is a mixture containing 2,6-dichlorophenol and 2,4-dichlorophenol, and small quantities of trichlorophenols and unreacted o-chlorophenol. The separation of isomerically pure 2,6-dichlorophenol from such a mixture by conventional methods is a difficult and tedious procedure. Effective separation of these isomers by distillation is usually not practical because of their close boiling points. Separation by fractional crystallization is also impractical because of the similar properties of these compounds.

O. Hassel and K. Lunde in Acta Chemica Scandinavica 4, 200–204 (1950), describe the pyrolysis of 2,2,6,6-tetrachlorocyclohexanone at 260°–270°C. in the absence of a catalyst. While the product of the above described process is isomerically pure 2,6-dichlorophenol, the yield is low.

In view of the shortcomings of the above methods, there currently exists a need for an economical, easy process for the preparation of isomerically pure ortho chloro-substituted phenols in high yields. Nowhere has such a method been taught or suggested.

SUMMARY OF THE INVENTION

It is an object of this invention to provide a process for the preparation of isomerically pure ortho chloro-substituted phenols in high yields from compositions of the general formula:

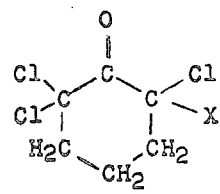

wherein X is a hydrogen or chlorine radical.

The objects of this invention are accomplished by a process wherein a chlorinated alicyclic ketone of the following general formula is dehydrochlorinated:

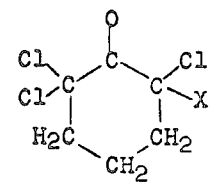

wherein X is a hydrogen or chlorine radical. It is essential that the contacting be in the presence of a nitrogen containing catalyst which is an amine, amide, urea, or acid salt thereof at a reaction temperature between about 100°C. and about 250°C. for a period of time sufficient to effect substantial dehydrochlorination of said chlorinated alicyclic ketone.

Chlorinated alicyclic ketones useful in the process of this invention are 2,2,6-trichlorocyclohexanone and 2,2,6,6-tetrachlorocyclohexanone. 2,2,6,6-Tetrachlorocyclohexanone is prepared by well known processes. 2,2,6-Trichlorocyclohexanone is prepared, for example, by adding 475 grams of chlorine under substantially anhydrous conditions to 240 ml. of carbon tetrachloride and 196 grams of cyclohexanone at 15°C. to 30°C. By substantially anhydrous conditions we mean that no more than 1 percent by weight of water based on the weight of the cyclohexanone be present in the reaction mixture and preferably no more than 0.5 percent by weight of water.

More particularly the amines, amides, and ureas which are useful as catalysts are of the following general formula:

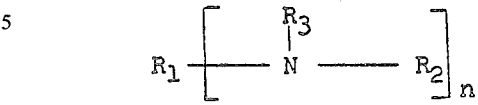

wherein n is a whole integer 1 or 2; $R_1$ is an alkyl, aryl, acyl, or aroyl group when n is 1, and $R_1$ is a carbonyl group when n is 2; and $R_2$ and $R_3$ are independently either a hydrogen radical, alkyl or aryl.

Heteroaromatic amines are also useful as catalysts. Generally speaking, as used herein, the term heteroaromatic amines refers to cyclic compounds having one or more aromatic rings, and having one or more amine nitrogens in an aromatic ring. Generally speaking, as used hereinbefore, the term "alkyl-substituted heteroaromatic amines" refers to those heteroaromatic amines containing one or more amine nitrogens in the aromatic ring, and in which the alkyl substituent of the molecule has from one to ten carbons, preferably.

Suitable heteroaromatic amine catalysts for use in this invention include, for example:
 pyridine
 alkyl-substituted pyridines
 quinoline
 alkyl-substituted quinolines
 isoquinoline
 alkyl-substituted isoquinolines
 pyrazine
 pyrrole
 N-alkylpyrrole
 alkyl-substituted pyrazines
 pyrimidine
 alkyl-substituted pyrimidine Illustrative examples of alkyl-substituted pyridines suitable for use in accordance with this invention include the collidines, lutidines, and picolines, respectively which are the tri, di, and mono methyl substituted isomers. Illustrative examples of other alkyl-substituted pyridines which are satisfactory for use in accordance with the present invention include:
 2-ethylpyridine
 2-n-propylpyridine
 2-n-butylpyridine
 2-isobutylpyridine
 2,4-diethylpyridine
 2,4-di-n-propylpyridine
 2-ethyl-4-propylpyridine
 2-isobutyl-4-n-propylpyridine
 2,4,6-triethylpyridine
 2,4-diethylpyridine
 2-benzylpyridine
 2,4-dibenzylpyridine
 2,4,6-tri-n-propylpyridine Illustrative examples of quinoline compounds which are satisfactory for use in accordance with the present invention include:
 2-methylquinoline
 2-ethylquinoline
 2-n-propylquinoline
 2,4-dimethylquinoline
 2-methyl-4-ethylquinoline
 2-n-butylquinoline
 2,4-di-n-butylquinoline
 2-isobutylquinoline Illustrative alkyl-substituted isoquinoline catalysts satisfactory for use in accordance with the present invention include:
 1-methylisoquinoline
 1-ethylisoquinoline
 1-n-propylisoquinoline
 1-n-butylisoquinoline
 3-methylisoquinoline
 3-n-propylisoquinoline
 4-n-butylisoquinoline, and
 4-isobutylisoquinoline, for example.

Preferred N-alkylpyrroles for use in accordance with this invention are those having -n-alkyl substituent with between 1 and 10 carbon atoms, inclusive.
 N-methylpyrrole
 N-ethylpyrrole
 N-n-butylpyrrole, and
 N-isobutylpyrrole, for example.

Illustrative pyrazine compounds which are satisfactory for use in accordance with the present invention include:
 2-methylpyrazine
 2-ethylpyrazine
 2-propylpyrazine
 2,3-dimethylpyrazine
 2-methyl-3-propylpyrazine
 2,3-dimethylpyrazine
 2,3-diethylpyrazine
 2,6-dimethylpyrazine
 2,3,6-triethylpyrazine, and the like.

Illustrative alkyl-substituted pyrimidines for use in accordance with this invention include:
 2-methylpyrimidine
 2-ethylpyrimidine
 4-methylpyrimidine
 4-isobutylpyrimidine
 2-methyl-4-isobutylpyrimidine, and the like.

Suitable aliphatic amines include for example the primary, secondary or tertiary alkyl amines such as n-butylamines, t-butylamines, isobutylamines, n-propylamines, isopropylamines, the ethylamines, and the n-pentylamines, neo-pentylamines, and the like and mixtures thereof. Generally speaking, the term alkyl as used hereinbefore include those alkyls substituents having up to 10 carbon atoms, and it is preferred that the alkyl substituents have between 1 and 4 carbon atoms. It is not necessary that the secondary and tertiary amines have identical substituents in each molecule and it is perfectly acceptable, for example, to have mixed substituents such as for example t-butyl isopropyl ethylamine, diethyl isopropylamine, and the like. As used herein the term "aliphatic amines" is also intended to include those amines having aliphatic substituents attached at the amine nitrogen, which aliphatic substituents have, in turn, aromatic substituents. An example of the latter is diethylbenzylamine.

Examples of aromatic amines that is, those amines, of the compounds of the structural formula set forth above in which $R_1$ is aromatic, include those aromatic amines having an aromatic amine substituent attached directly to the amine nitrogen. Examples of aromatic amines which are emminently satisfactory in accordance with the present invention include diethylaniline, and tri-phenyl amine.

Generally speaking, the tertiary amines are most preferred and the secondary amines are preferable to the primary amines.

Suitable amides include, for example, formamide, N,N-dimethylacetamide, N,N-diethylacetamide, N,N-dimethylpropionamide, and N,N-diethylpropionamide. Suitable ureas are for example urea, tetramethylurea, tetraethylurea, dimethyldiethylurea, monomethyltriethylurea, trimethylethylurea, and 2-imidazolidone.

The dehydrochlorination is also carried out in the presence of acid salts of the above nitrogen-containing catalyst. Suitable acids include both inorganic and organic acids such as hydrochloric acid and acetic acid.

It is to be understood that the nitrogen containing compounds referred to above are the catalysts which are useful in accordance with the present invention, and that the catalysts can be provided, in the reaction mixture, by adding as an ingredient to the reaction mixture either the catalyst, as such, or a salt of the nitrogen containing catalyst compound. Thus, the reaction may also be carried out in the presence of the acid salts of the above catalysts. Suitable acid salts include both inorganic acids such as the mineral acids, for example, and organic acids, such as, for example, carboxylic acids containing up to 10 carbon atoms, for example. Illustrative mineral acid salts contemplated for use in accordance with the present invention include the hydrochloric acid, and sulfuric acid salts, and other mineral acid salts, and illustrative organic acid salts incude the acetic acid, propionic acid, and other organic acid salts as well.

The nature of the particular organic acid portion of the acid salt catalyst ingredient is of no substantial importance inasmuch as it is the nitrogen containing compound, or nitrogen-containing portion of the salt ingredient which serves as the catalyst. Moreover, copious quantities of hydrochloric acid are normally produced during the course of the reaction of the present invention, and it is to be understood that a substantial portion of the catalyst is present in the reaction mixture as the hydrochloric acid salt regardless of the particular ingredient which is used as the source of the catalyst. Chlorination of the catalyst or of the salt portion thereof does not destroy the efficacy of the catalyst in the method of the present invention.

With respect to the alkyl substituents referred to above, those alkyl groups having up to 10 carbon atoms are preferred; those with 1 to 4 carbons are particularly preferred.

As used herein, and particularly in use in connection with the substituents in the above identified structural formulas, the term aryl is intended to include those organic radicals derived from an aromatic hydrocarbon by the removal of one atom e.g. phenyl, naphththoyl, and is also intended to include those organic radicals derived from alkyl substituted hydrocarbons e.g. those phenyl radicals which have one or more alkyl substituents.

As used herein, and particularly in connection with the above structural formula, the term acyl is intended to include those organic radicals derived from an organic acid by the removal of the hydroxyl group, e.g. those aliphatic and aromatic carboxy acids having up to 10 carbon atoms, for example. Illustrative acyl radicals include, for example, formyl, acetyl, propionyl, benzoyl, etc.

As used herein, the term acyl is intended to include those radicals referred to as aroyl such as, for example, benzoyl, napthhoyl, and radicals derived from acids having included therein alkyl substituted aromatic groups in which one or more alkyl substituents having from 1 to 10 carbons are attached to the aromatic portion of the molecule.

The reaction can be conducted either continuously or in a batchwise manner and under a superimposed atmosphere of nitrogen or other gas which does not interfere with the reaction.

At room temperature, 2,2,6-trichlorocyclohexanone is a liquid. 2,2,6,6-Tetrachlorocyclohexanone must be heated above room temperature to be in the liquid state. The melting point of pure 2,2,6,6-tetrachlorocyclohexanone is 82°–83°C. but will be depressed somewhat by the presence of catalyst or impurities.

In carrying out the dehydrochlorination it is preferred that liquid chlorinated alicyclic ketone is mixed with a nitrogen-containing catalyst or salt thereof and continuously fed through a reaction zone held at a temperature between 100°C. and 300°C. It is not important that the catalyst be first mixed with liquified chlorinated alicyclic ketone and then introduced to the reaction zone; the chlorinated alicyclic ketone may be first heated to a temperature between 100°C. and 250°C. and then contacted with the catalyst in the reaction zone.

To maximize the yield of o-chlorophenol and minimize the side reaction products when the chlorinated alicyclic ketone is 2,2,6-trichlorocyclohexanone it is preferred that the contacting is at a reaction temperature of about 150°C. to about 200°C. To maximize the yield of 2,6-dichlorophenol when the chlorinated alicyclic ketone is 2,2,6,6-tetrachlorocyclohexanone it is preferred that the contacting be at a temperature between about 180°C. and about 225°C.

The amount of catalyst is not critical. While the amount of catalyst does not increase the yield of ortho chlorinated phenol, it does effect the rate of the dehydrochlorination. We have found that it is preferred that at least 0.1 percent by weight of catalyst based on the weight of the chlorinated alicyclic ketone be contacted with the ketone in the reaction zone. It is also preferred that no more than 10 percent by weight of the catalyst be present. While more than 10 percent by weight of the catalyst may be used, it is considered uneconomical to do so.

The contact or reaction time in the reaction zone varies somewhat with the temperature, the chlorinated alicyclic ketone, the catalyst, and the like. More particularly, the necessary reaction time is decreased by both higher temperature and catalyst level. Contact times of from about 5 seconds to 10 minutes in the presence of about 2 percent by weight of catalyst at about 150°C. to about 225°C. have proved satisfactory. The preferred contact time when the chlorinated alicyclic ketone is 2,2,6-trichlorocyclohexanone varies from about 15 seconds to about 3 minutes when the temperature is about 175°C. The preferred contact time is from about 30 seconds to 5 minutes when 2,2,6,6-tetrachlorocyclohexanone is the chlorinated alicyclic ketone and when the temperature is about 200°C. It is preferred that the chlorinated alicyclic ketone be contacted with the catalyst in the reaction zone for no longer a period than necessary to effect substantial dehydrochlorination. Longer contact time can lead to the possibility of side reaction products. It is clear from the above discussion that comparatively short reaction times are preferred in the present invention.

It is preferred that the dehydrochlorination be carried out under substantially anhydrous conditions. For each mole of o-chlorophenol or 2,6-dichlorophenol produced in the dehydrochlorination reaction, there are formed two moles of hydrogen chloride. This by-product in the presence of water can cause solvolysis or other side reactions. It is therefore preferred that the reaction be carried out in a dry, inert atmosphere. By substantially anhydrous, it is to be understood that we mean no more than 1 percent by weight of water based on the weight of the chlorinated alicyclic ketone be present in the reaction mixture and preferably no more than 0.5 percent by weight of water.

The product of the above described process contains catalyst but for many purposes no separation is required. When desired, the product can be purified by conventional procedures, most typically, recrystallization.

DESCRIPTION OF THE PREFERRED EMBODIMENTS

The following preferred embodiments of the invention are shown for the purpose of illustrating the invention and demonstrating the best mode for practicing the invention. It will be apparent to those skilled in the art that various changes and modifications may be made therein without departing from the spirit and scope of the invention as it is more precisely defined in the subjoined claims.

EXAMPLE 1

A series of dehydrochlorination reactions was carried out wherein the chlorinated alicyclic ketone was 2,2,6,-6-tetrachlorocyclohexanone and the catalyst was selected from various amines, amides, ureas, and salts thereof. The type of catalyst used in each test is given in Table I.

The following procedure was followed in each test: 25 grams of 2,2,6,6-tetrachlorocyclohexanone and 0.1 gram of catalyst were placed in a small test tube fitted with a condenser. The reaction mixture in the tube was heated for 20 minutes at 200°C., after which time, the heating source was removed and the tube allowed to cool for 5 minutes. Then 5 ml. of tetrahydrofuran was added to the reaction mixture and the solution was analyzed by vapor phase chromatography. The relative percent by weight composition of 2,6-dichlorophenol and 2,2,6,6-tetrachlorocyclohexanone as determined by V.P.C. analysis is given in Table I.

Table I

| Test No. | Catalyst | Relative Percent by Weight Composition (V.P.C. Analysis) | |
|---|---|---|---|
| | | 2,6-dichlorophenol | 2,2,6,6-tetrachlorocyclohexanone |
| 1. | none | 14 | 86 |
| 2. | pyridine | 100 | 0 |
| 3. | collidine hydrochloride | 94 | 6 |
| 4. | tetramethylurea | 99 | 1 |
| 5. | formamide | 49 | 51 |
| 6. | dimethylacetamide | 100 | 0 |
| 7. | n-butylamine | 74 | 26 |
| 8. | t-butylamine | 49 | 51 |
| 9. | di-n-propylamine | 83 | 17 |
| 10. | tri-n-butylamine | 100 | 0 |
| 11. | diethylaniline | 100 | 0 |

EXAMPLE 2

Twenty-five grams of 2,2,6-trichlorocyclohexanone containing 0.5 gram of collidone hydrochloride was placed in a dropping funnel. The dropping funnel was fitted to a 100 ml. 3-necked flask further equipped with a gas outlet and a stirrer. The flask was held at 200°C. while the ketone was slowly introduced into the flask over a period of 20 to 30 minutes.

The product of the above reaction was then distilled under reduced pressure (40 mm.) to yield 14 grams (87 percent by weight) of o-chlorophenol.

EXAMPLE 3

Following the procedure in Example 2, 25 grams of 2,2,6,6-tetrachlorocyclohexanone containing 0.5 gram of collidine hydrochloride yielded 15.6 grams (90 percent by weight) of 2,6-dichlorophenol, melting point 64°–65°C.

EXAMPLE 4

The following procedure was followed: 281.8 grams of 2,2,6,6-tetrachlorocyclohexanone and 5.6 grams of collidine hydrochloride were introduced into a dropping funnel. The dropping funnel was heated with a heating lamp until the 2,2,6,6-tetrachlorocyclohexanone was liquid.

The 2,2,6,6-tetrachlorocyclohexanone containing catalyst was swept with nitrogen and dropwise introduced into a 24 inch column (7/8 in. O.D.; 9/16 in. I.D.) which was packed with 4 mm. diameter glass beads. The packed column was heated by an electric tube furnace to about 200°C. along its entire length.

The dehydrochlorination was continued for one and one-half hours until all of the 2,2,6,6-tetrachlorocyclohexanone had been passed through the heated column and converted to product. The dehydrochlorinated mixture was recovered and the mixture distilled under reduced pressure (40 mm). The recovered distilled product was 177 grams (91 percent by weight) of 2,6-dichlorophenol, melting point 64°–65°C.

EXAMPLE 5

Following the procedure of Example 4, but omitting the heating step in the dropping funnel, 165.4 grams of 2,2,6-trichlorocyclohexanone in place of 2,2,6,6-tetrachlorocyclohexanone was dehydrochlorinated in the presence of 2.5 grams of collidine hydrochloride. The distilled product was 97 grams (91 percent by weight) of o-chlorophenol.

The above examples clearly demonstrate the accomplishment of this invention. In Example 1, it is demonstrated that amines, amides, ureas, and salts thereof promote the dehydrochlorination of 2,2,6,6-tetrachlorocyclohexanone to isomerically pure 2,6-dichlorophenol. Test 1 is not in accordance with this invention, but was made as an example of a process which does not utilize a catalyst. It should be emphasized that no other dichlorophenol isomer is produced. Example 1 is also an example of a batch process.

Examples 2 and 3 further illustrate our invention. In Example 2, the 2,2,6-trichlorocyclohexanone is converted to o-chlorophenol in 87 percent yield. In Example 3, the 2,2,6,6-tetrachlorocyclohexanone is dehydrochlorinated to 2,6-dichlorophenol in 90 percent yield.

Examples 4 and 5 are illustrative of continuous processes. In Example 4, a continuous process is described for the dehydrochlorination of 2,2,6,6-tetrachlorocyclohexanone. In Example 5, a continuous process is described for the dehydrochlorination of 2,2,6-trichlorocyclohexanone.

From the foregoing description it is considered to be clear that the present invention contributes a substantial benefit to the art by providing a process for the facile preparation of isomerically pure o-chlorophenols in high yields from 2,2,6-trichlorocyclohexanone and 2,2,6,6-tetrachlorocyclohexanone. We therefore claim:

We claim:

1. A process for making an ortho chlorinated phenol which comprises: contacting a chlorinated alicyclic ketone and a nitrogen-containing catalyst at a temperture between 100°C. and 250°C; said ketone of the general formula:

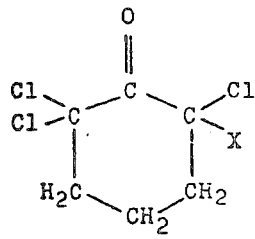

wherein X is hydrogen or chlorine; said nitrogen-containing catalyst being selected from the group consisting of collidine, pyridine, quinoline, lutidine, picoline, pyrazine, a compound of the formula:

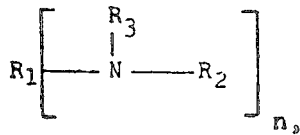

and acid salts thereof selected from the group hydrochloric acid salts and acetic acid salts; wherein $n$ is a whole integer 1 or 2; $R_1$ is alkyl having between 1 and 4 carbon atoms, phenyl, or acyl selected from the group formyl, acetyl and propionyl when $n$ is 1, and $R_1$ is carbonyl when $n$ is 2; and $R_2$ and $R_3$ are independently either a hydrogen or alkyl having between 1 and 4 carbon atoms, or phenyl or alkyl substituted phenyl.

2. The process as in claim 1 wherein said catalyst is present in an amount more than 0.1 percent by weight based on the weight of the chlorinated alicyclic ketone.

3. The process as in claim 1 wherein said catalyst is present in an amount from 0.1 percent to 10 percent by weight, based on the weight of the chlorinated alicyclic ketone.

4. The process as in claim 1 wherein said chlorinated alicyclic ketone is 2,2,6-trichlorocyclohexanone and wherein said contacting takes place at a reaction temperature of about 150°C. to about 200°C.

5. The process as in claim 1 wherein said chlorinated alicyclic ketone is 2,2,6,6-tetrachlorocyclohexanone and wherein said contacting takes place at a temperature of about 180°C. to about 225°C.

6. The process as in claim 1 wherein said contacting comprises continuously feeding said chlorinated alicyclic ketone containing said nitrogen-containing catalyst in an inert atmosphere through a reaction zone held at said reaction temperature.

7. The process as in claim 1 wherein said catalyst is collidine.

8. The process as in claim 1 wherein said aliphatic amine is tri-n-butylamine.

9. The process for making an ortho chlorinated phenol which comprises contacting a chlorinated alicyclic ketone of the general formula:

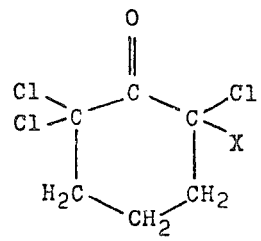

wherein X is a hydrogen or a chlorine with a nitrogen-containing catalyst which is a meteroaromatic amine a compound of the formula:

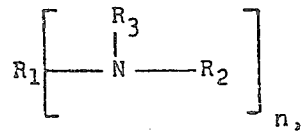

wherein $n$ is a whole integer 1 or 2; $R_1$ is an alkyl, phenyl, or acyl group when $n$ is 1, and $R_1$ is a carbonyl group when $n$ is 2; and $R_2$ and $R_3$ are independently either a hydrogen, phenyl or alkyl group, said contacting taking place at a temperature between 100°C. and 250°C., said phenyl being unsubstituted and alkyl substituted, said alkyl having from 1 to 4 carbon atoms, said acyl having from 1 to 3 carbon atoms.

10. The process as in claim 9 wherein there is present more than 0.1 percent by weight based on the weight of the chlorinated alicyclic ketone of said nitrogen-containing catalyst.

11. The process as in claim 9 wherein there is present from 0.1 percent by weight of said nitrogen-containing catalyst based on the weight of the chlorinated alicyclic ketone to 10 percent.

12. The process as in claim 9 wherein said catalyst is collidine.

13. The process as in claim 9 wherein said compound of the formula is tri-n-butylamine.

14. The process as in claim 9 wherein said catalyst is a heteroaromatic.

* * * * *

UNITED STATES PATENT OFFICE
CERTIFICATE OF CORRECTION

PATENT NO. : 3,891,717

DATED : June 24, 1975

INVENTOR(S) : Eugene C. Gilbert, Robert E. Jones and Edward Sherman

It is certified that error appears in the above-identified patent and that said Letters Patent are hereby corrected as shown below:

in the Abstract, column 2, line 20; column 2, line 35, delete the formula 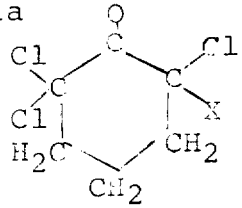 and substitute therefor 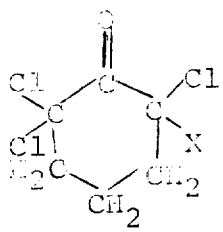

In Example 2 at column 7, line 65 "collodine" should read --collidine--.

Column 9, line 20; delete "We therefore claim".

Claim 9 at column 10, line 30 "meteroaromatic amine" should read --heteroaromatic amine or--.

Signed and Sealed this eleventh Day of May 1976

[SEAL]

Attest:

RUTH C. MASON
Attesting Officer

C. MARSHALL DANN
Commissioner of Patents and Trademarks